Oct. 23, 1945.     N. ALPERT     2,387,633
CUTTING IMPLEMENT
Filed Jan. 10, 1944
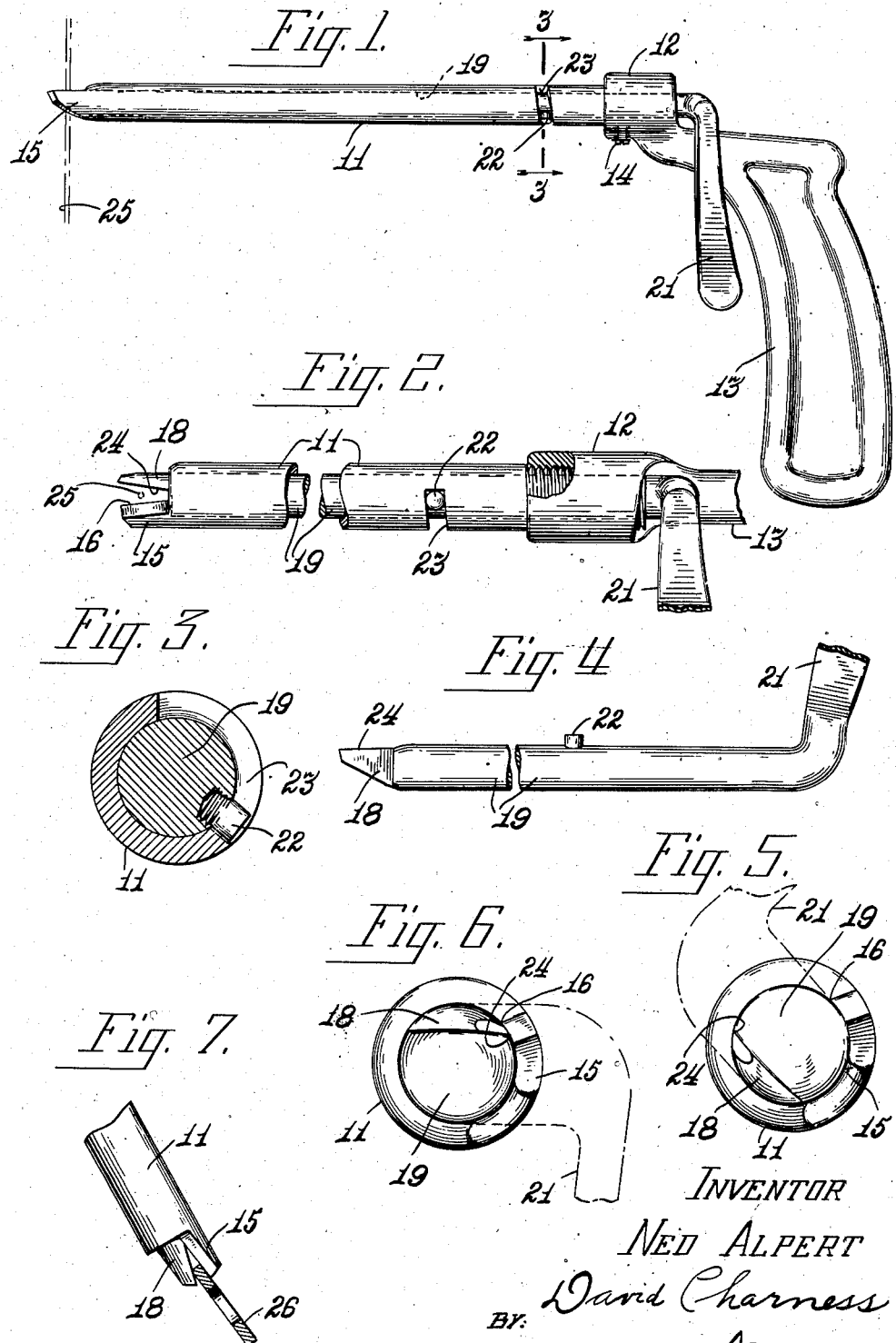
INVENTOR
NED ALPERT
BY David Charness
ATTORNEY Patented Oct. 23, 1945

2,387,633

UNITED STATES PATENT OFFICE 2,387,633

CUTTING IMPLEMENT

Ned Alpert, Milwaukee, Wis.

Application January 10, 1944, Serial No. 517,764

5 Claims. (Cl. 30—240)

The invention relates to improvements in cutting implements and is more particularly concerned with the novel construction of a cutter for wire and the like which is also useful to retrieve small articles such as for example, nuts, washers, etc., from places normally inaccessible.

Cutters for wire and the like usually are constructed of a multiple of pieces assembled into a structure of the kind often referred to as lever cutters. Such known devices are of limited utility because of the bulk and overall size of the cutting tools therein contained and because of the need for the exertion of excessive manual energy to effect the cutting operation. It is therefore, an object of the present invention to provide a cutting implement of the kind exemplified in the accompanying drawing which is particularly designed for fine work and hence is light in weight and lacks the usual bulk of known cutting devices and further, one which is highly efficient in use and which requires but little manual effort to use.

Another object of the present invention is to provide a cutting implement having related cutting elements rotatable relative to each other about a small radius.

Another object is to provide a cutting implement with cutting elements of a kind easily moved relative to each other to effect a cutting operation in response to but slight pressure exerted by a finger or thumb of the hand in which the implement is held while being used.

Another object of the invention is to provide a cutting implement of a kind having relatively rotatable cutting tools wherein the cutting tools also are moved relative to each other at right angles to the direction of relative rotation during the cutting operation so as to increase the cutting efficiency of the tools.

Another object is to provide a novelly constructed cutting and gripping implement consisting of few parts and which is not expensive to manufacture, but is easy to assemble and highly efficient in use.

Other and further objects of the present invention will be apparent from the following description and claims and are illustrated in the accompanying drawing which, by way of illustration, shows a preferred embodiment and the principle thereof and which is considered to be the best mode for applying that principle. Other embodiments of the invention embodying the same or equivalent principle may be used and structural changes may be made as desired by those skilled in the art without departing from the spirit of the present invention and the scope of the appended claims.

In the drawing:

Fig. 1 is a side elevational view of the cutting implement embodying features of the present invention.

Fig. 2 is an enlarged top plan view of the cutting implement, partly broken away.

Fig. 3 is a transverse sectional view taken on line 3—3 of Fig. 1.

Fig. 4 is an elevational view of the rotatable cutting tool, partly broken away.

Fig. 5 is an end elevational view of the cutting implement showing the cutting tools in an open position.

Fig. 6 is a view similar to Fig. 5, showing the cutting tools in a closed position.

Fig. 7 is an elevational view of one end of the cutting implement showing it in use as a retriever of small articles.

Referring to the exemplification of the invention as illustrated in the accompanying drawing, the cutting implement includes a tubular barrel or outer casing 11 consisting of a metal tube externally threaded at one end and screwed into an internally threaded boss 12 located on the upper end of a handle or grip 13 of a size to be conveniently gripped by the fingers of one hand. The casing 11 is secured in its mounting by a set screw 14. The free or forward end of the casing 11 is cut away in part to provide a cutting tool 15 which generally extends forwardly beyond the front end of the casing. The cutting tool 15 is tooled to provide a substantially straight cutting edge 16 which preferably is disposed at a slight angle to the longitudinal axis of the casing as best illustrated in Fig. 2.

A second or co-operating cutter tool 18 is associated with the cutting tool 15. As best shown in Fig. 4, the cutting tool 18 is fashioned on one end of a rod 19 which has its other end turned substantially at right angles to the plane of the rod and flattened as illustrated to define a trigger portion 21.

The rod 19, exclusive of the cutting tool 18 and the trigger portion 21, is substantially of the same length as the tubular casing 11 and it is of such diameter as to have a snug bearing fit within said casing when extended therethrough in a manner to dispose the cutting tool 18 in cooperative relation with the cutting tool 15 and the trigger 21 adjacent the handle or grip 13. Withdrawal of the rod from the casing 11 is prevented preferably by means of a pin 22 which is threaded into the rod 19 so as to project through a slot 23 in the tubular casing 11.

The cutting tool 18 has a cutting edge 24 thereon and when the two edges 16 and 24 are in an open or spread position as shown in Fig. 2, a wire 25 or the like may be located in the gap therebetween. When the cutting edges are in such open position, the trigger 21 assumes an angular position above the horizontal as indicated in Figs. 2 and 5. Now, when the handle or grip 13 is held by the fingers of one hand, the operator places the thumb of said hand on the trigger 21 and urges it downwardly inwardly towards the grip. Such movement of the trigger rotates the rod 19 sufficiently to close the gap between the cutting edges 16 and 24 thus severing the wire 25. Upon reference to Fig. 6 it will be noted that the co-operating tools 15 and 18 overlap each other when in closed position so as to thereby prevent the formation of burrs or feathers on the respective cutting edges. Further, the effectiveness of the cutting operation is increased because of the angular disposition of the circumferential slot 23 which causes the rod 19 to move rearwardly slightly while being rotated in a direction to close the gap between the cutting edges 16 and 24 so as to thereby effect relative longitudinal movement between said edges during the cutting operation.

It should be obvious that a tremendous force is made available at the cutting edges in return for a slight expenditure of force upon the trigger 21 because of the small radius of the rotating cutting tool 18 as compared to the radius of the trigger.

Fig. 6 shows the implement in use as a retriever of small articles, such as for example, the washer 26. Due to the small size of the working end of the implement it can be inserted into relatively small spaces or through small openings to retrieve such articles simply by engaging the article between the cutting tools 15 and 18 and squeezing the trigger towards the grip.

Although an exemplary form of the improved cutting and retrieving implement has been shown in detail in the accompanying drawing and described in detail hereinabove, it is to be understood that the structure may embody a variety of modifications in detail without departing from the spirit of the invention or the scope of the appended claims.

I claim:

1. In a cutting implement of the character described, a tubular casing having a hand grip at one end, said hand grip extending at right angles to the tubular casing, a cutting tool integral with the other end of said tubular casing, a rod substantially co-extensive with and telescoped within said tubular casing, a cutting tool integral with one end of said rod to co-operate with the first mentioned cutting tool, a trigger element on the other end of said rod, a helical slot in the tubular casing, and a pin on said rod engageable in said slot, said pin and slot being jointly effective to prevent withdrawal of the rod and to cause relative longitudinal movement between said parts when said parts are rotated relative to each other.

2. In a cutting implement of the character described, a tubular casing having a hand grip at one end, said grip extending at right angles to the tubular casing, a cutting tool integral with the other end of said tubular casing, a rod substantially co-extensive with and telescoped within said tubular casing, a cutting tool integral with one end of said rod to co-operate with the first mentioned cutting tool, a trigger element on the other end of said rod, said trigger element extending substantially at right angles to the rod and being disposed closely adjacent to the hand grip, and means to prevent separation of said parts, said means comprising a helical slot and cooperating pin effective to cause relative longitudinal movement between said parts when said parts are rotated relative to each other.

3. In a cutting implement of the character described, a tubular member, a cutting tool integral with and extending beyond an end of said member, a rod substantially co-extensive with and telescoped within said tubular member, a cutting tool extending beyond one end of said rod to co-operate with the first mentioned cutting tool, said tools having their cutting edges spaced apart circumferentially, an approximately circumferential slot in the tubular member, and a pin on said rod engageable in said slot to prevent withdrawal of the rod, the slot being longitudinally inclined slightly to cause relative longitudinal movement between the tubular member and rod when they are rotated relative to each other.

4. In a cutting implement of the character described, a hand grip, a tubular member mounted at one end in said hand grip, a cutting tool on the other end of said tubular member, said tool having a cutting edge substantially parallel to the longitudinal axis of said tubular member, a rod substantially co-extensive with and telescoped within said tubular member, a cutting tool on one end of said rod, said second cutting tool having a cutting edge to co-operate with the cutting edge of the first mentioned cutting tool and normally spaced therefrom, means to prevent withdrawal of the rod, means to cause relative rotation between the tubular member and said rod to close the gap between said cutting edges, and means to cause relative longitudinal movement between said cutting edges while said tubular member and rod are being moved rotatably relative to each other.

5. A cutting implement of the character described, comprising, a hand grip having a tubular boss, a tubular casing mounted on and secured at one end to said boss, a cutting edge formed on the other end of said tubular casing, said edge being substantially parallel to the axis of said casing, said casing having an approximately circumferential inclined slot, a rod extending through said tubular casing, said rod having its end adjacent to the boss extended substantially at right angles thereto so as to provide a trigger element engageable to rotate the rod relative to the casing, a cutting edge on the other end of said rod disposed to cooperate with the cutting edge on the casing when said rod is rotated in one direction, and a pin on said rod engageable in said slot to prevent separation of the parts and impart relative longitudinal movement between the rod and casing during relative rotation thereof.

NED ALPERT.